United States Patent [19]
Westerman et al.

[11] Patent Number: 5,207,541
[45] Date of Patent: May 4, 1993

[54] SCARFING APPARATUS

[75] Inventors: Everett A. Westerman, Auburn; Phillip E. Roll, Kent, both of Wash.

[73] Assignee: The Boeing Company, Seattle, Wash.

[21] Appl. No.: 646,941

[22] Filed: Jan. 28, 1991

Related U.S. Application Data

[63] Continuation-in-part of Ser. No. 284,137, Dec. 13, 1988, Pat. No. 4,987,700.

[51] Int. Cl.[5] .................................................. B23C 3/16
[52] U.S. Cl. .................................... 409/179; 409/180; 409/132
[58] Field of Search ................. 51/119, 120, 165.89, 51/283 R, DIG. 14, 90, 99, 119, 281 R; 409/178, 179, 180, 131, 32

[56] References Cited

U.S. PATENT DOCUMENTS

| | | | |
|---|---|---|---|
| 2,480,354 | 8/1949 | Bonnet | 76/107 |
| 2,638,136 | 5/1953 | Miller | 144/136 |
| 2,718,732 | 5/1952 | Comstock, III | 51/47 |
| 2,804,065 | 8/1957 | Ghiglieri | 51/90 |
| 3,442,309 | 5/1969 | Jentsch | 409/178 |
| 3,906,834 | 9/1975 | Gladwin | 409/132 |
| 3,910,159 | 10/1975 | Gladwin | 90/15 |
| 4,061,077 | 12/1977 | Gladwin | 90/15 |
| 4,375,733 | 3/1983 | Bando | 51/3 |
| 4,538,946 | 9/1985 | Block | 409/179 |
| 4,601,619 | 7/1986 | Stinnett | 409/180 |
| 4,610,586 | 9/1986 | Langeder | 409/300 |
| 4,614,466 | 9/1986 | Snyder | 409/179 |
| 4,987,700 | 1/1991 | Westerman et al. | 51/34 |

FOREIGN PATENT DOCUMENTS

| | | |
|---|---|---|
| 2749287 | 10/1979 | Fed. Rep. of Germany . |
| 112701 | 2/1979 | Japan . |
| 537762 | 3/1977 | U.S.S.R. . |

Primary Examiner—Bruce M. Kisliuk
Assistant Examiner—Jack Lavinder
Attorney, Agent, or Firm—Seed and Berry

[57] ABSTRACT

A method and apparatus for producing a controlled tapered cut on a curved surface in preparation for repairing a damaged area on the surface. The apparatus includes a cutting tool which is revolved around the damaged area at incrementally smaller radii until the entire damaged area and the periphery thereof has been machined. The cutting tool is maintained in a position such that the surface of the workpiece is machined along a tapered plane which is disposed at a predetermined angle with respect to the tangent to the surface of the workpiece. As the normal to the workpiece surface changes its angular orientation, the position of the cutting tool is correspondingly adjusted to machine the workpiece. The cutting tool is disposed in a channel member extending normal to the surface in such a manner that the angular position thereof can be adjusted. The channel member is connected to a pivot shaft utilizing cables and torque rods such that the channel member and the cutting tool can be revolved by the pivot shaft around the damaged area. The resulting machined surface is tapered, allowing the workpiece to be repaired utilizing composite materials consisting of a plurality of plies which are bonded to one another.

18 Claims, 9 Drawing Sheets

SCARFING APPARATUS

CROSS-REFERENCE TO RELATED APPLICATION

This application is a continuation-in-part of U.S. patent application Ser. No. 284,137, filed Dec. 13, 1988, now U.S. Pat. No. 4,987,700.

TECHNICAL FIELD

This invention relates to the field of tool guides, and more particularly, to a tool guide for routers which produces a wide variety of cuts, including substantially tapered circular cuts in spherical or curvilinear surfaces.

BACKGROUND OF THE INVENTION

Modern aircraft are increasingly incorporating resin composite materials in the construction of a variety of components because the weight/strength ratio of many composite materials exceeds that of many metals. In a typical construction of composites used for modern aircraft, each layer of the composite is formed with plies of resinous matrix material reinforced with fiber. An example is graphite or carbon reinforced epoxy.

While providing many advantages in terms of strength and weight, composite materials pose unique problems when one is attempting to repair damaged areas. One problem which frequently occurs is repairing damaged composite components while retaining the structural integrity of the original component. Since loads in composite materials are carried by the fibers of the material, a repair preparation must expose each respective layer of fiber of a composite workpiece for bonding replacement materials to the workpiece in a manner that permits load transfer between each layer of the part and each layer of the patch. Failure to properly bond the fibers of each layer of the composite workpiece may result in the workpiece not being able to support design loads and damage to the composite.

The repair of composite materials therefore requires that the damaged area of a composite workpiece be removed in a manner to expose the fibers of each layer for bonding to the fibers of the patch. Typically, damaged composite material is removed from a workpiece in preparation for repair by a process known as "scarfing." Scarfing provides a repair region, surrounding a damaged area, having beveled or angled walls to receive new composite material and provides a contact surface for each layer or ply. Preferably, the repair region has a complex shape, such as a spherical or ovular shape, so that the repair plies of the patch may be placed in the repair region in layers wherein the fibers of each layer of the patch are bonded to the fibers of a respective layer of the composite workpiece. In this manner, the load bearing capability of the repaired composite workpiece is maximized.

Scarfing a workpiece requires an apparatus for providing tightly controlled dimensions over complex repair regions. Particularly, the angle of the walls of the repair region, i.e., the taper angle, must be carefully controlled to expose the fibers of each layer of the workpiece. Scarfing a workpiece having a complex surface requires apparatus capable of providing the tightly controlled dimensions, i.e., the taper angle, on the complex surface. This requires the scarfing apparatus to alter the positioning of the cutting instrument in response to alterations in the radius, or contour, of the surface.

Several tools have been developed that are ideal for scarfing flat surfaces of a workpiece. An example of such a tool is that disclosed in U.S. patent application Ser. No. 284,137 entitled "Mechanical Scarfing Apparatus," filed Dec. 13, 1988, the disclosure of which is incorporated herein, in its entirety by the foregoing reference. The scarfing apparatus disclosed in U.S. Ser. No. 234,137 is capable of scarfing complex cuts in a planar workpiece to maximize the load bearing capability of the repaired workpiece, as discussed above. However, the scarfing apparatus is difficult to use on a workpiece having a complex surface.

Soviet Union Inventor's Certificate No. 537,762, issued 1977 discloses a router mounted on the end of a shaft and an adjustment arm for adjusting the angle of the router. While this device can create complex repair regions into a flat surface of a workpiece, there does not appear to be any disclosure of apparatus for creating a complex repair region in a workpiece having a complex surface. The Inventor's Certificate also does not appear to disclose a mechanism for moving the router in a lateral direction. Accordingly, the apparatus disclosed in the Inventor's Certificate is not appropriate for scarfing a workpiece having a complex structure.

Another example of an apparatus for supporting a cutting instrument is shown in U.S. Pat. No. 2,638,136. This device includes a support structure that couples a router to a plurality of cross supports over a workpiece. In this invention, the cross-support members restrict movement of the router to a single plane which is perpendicular to the cross-support members. The router is adapted to pivot about the support structure, thereby enabling complex regions to be scarfed in a flat surface. However, no apparatus is shown that enables the position of the router to be controlled, at least in part, to follow the contour of the workpiece. Accordingly, the apparatus disclosed in U.S. Pat. No. 2,638,136 is not appropriate for preparing a close tolerance scarfing in a workpiece having a complex surface.

It is desirable, therefore, to provide scarfing apparatus which is responsive to the contour of the workpiece while adjusting the position of the cutting instrument. It is also desirable to provide scarfing apparatus capable of precision control of a cutting instrument on a variety of complex surfaces. It is further desirable to provide scarfing apparatus for generating tapered cuts tangent to the surface of a complex structure with precise control over the depth, quality, and angle of the cut.

SUMMARY OF THE INVENTION

The present invention is an improved scarfing apparatus for producing a controlled tapered cut on the surface of a workpiece to prepare a damaged area of the surface for repair. The apparatus is constructed for supporting a cutting tool so that the cutting tool will provide the tapered cut along a taper plane at a predetermined taper angle on the surface.

The improved scarfing apparatus of the subject invention includes a contour follower for moving the cutting instrument over a first direction of the surface of the workpiece. The contour follower is constructed to position the cutting instrument proximate the surface of the workpiece. The scarfing apparatus also includes a contour sensor for sensing the change in distance between the surface of the workpiece and a reference surface. The contour follower is responsive to the contour sensor for repositioning the cutting instrument thereby to maintain a predetermined spatial relationship between the cutting instrument and tangent of the surface of the workpiece as the cutting instrument is moved in the first direction.

DETAILED DESCRIPTION OF THE INVENTION

Figure 1A:
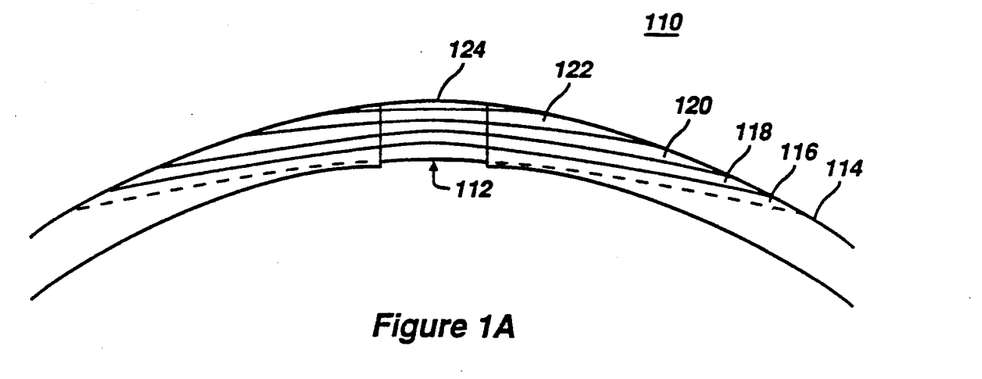
FIGS. 1A and 1B are cross-sectional views of typical curvilinear sections prepared with the improved scarfing apparatus of the present invention.

Referring now to FIGS. 1A through 2B, a plurality of cross-sectional views of typical repaired regions in composites are shown. FIG. 1A shows a cutaway view of a curvilinear composite construction 110 which is representative of a leading edge or fuselage of an aircraft. FIG. 1A shows a negative taper angle repair wherein a damaged area 112 is repaired by removing an exterior area of material defined by the taper cut 114. A plurality of repair plies 116, 118, 120, 122, and 124 are then applied as individual layers which conform to the angle of taper cut 114. Each of the respective repair ply layers may be bonded together with an adhesive such as epoxy and could be cured with a heat curing process prior to application of the next respective layer or after all layers have been applied. Materials for the repair plies and the adhesives used therewith are well known to those skilled in the art. A sufficient number of ply layers are deposited until the repaired area is substantially the same thickness as the composite construction 110.

Figure 1B:
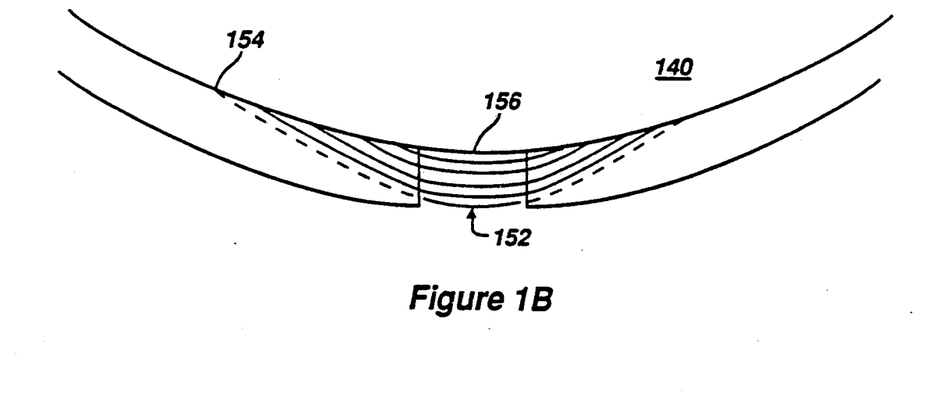

Referring now to FIG. 1B, an alternate method for repairing the curved composite construction 110 is shown. This technique provides an extreme positive taper angle repair wherein a damaged area 152 is repaired by removing an interior area of material defined by the taper cut 154. A plurality of repair plies 156 are applied over the damaged region 152 by conventional means wherein the repair plies substantially conform to the shape of the taper cut 154.

Figure 2A:
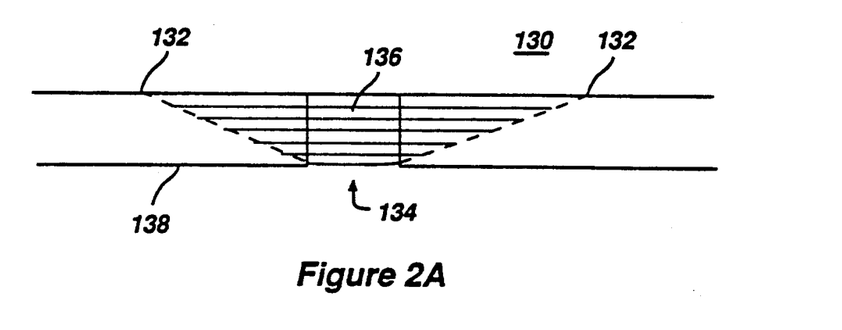
FIGS. 2A and 2B are cross-sectional views of typical repairs showing the plane regions prepared with the improved scarfing apparatus of the present invention.

Referring now to FIG. 2A, a taper cut repair in a substantially planar composite section 130 is shown. In this type of repair, a taper cut 132 is provided to remove the material surrounding the damaged area 134. A plurality of repair plies 136 of increasing area with respect to the surface 138 are applied as individual layers. A sufficient number of ply layers are deposited until the repaired area is substantially the same thickness as the composite construction 130. In this type of repair, the taper cut 132 is disposed with an angle of approximately 1°–5° with respect to the horizontal axis of member 130.

Figure 2B:
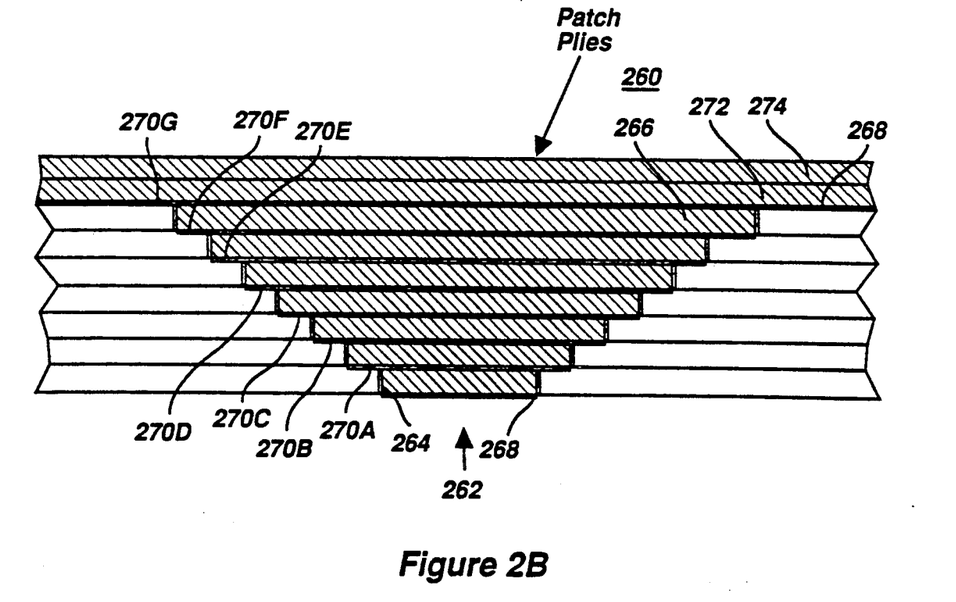

FIG. 2B is a cross section of a typical stepped repair in a composite structure 260. The composite structure 260 comprises seven plies wherein each respective ply is cut in a stepped or terraced manner surrounding the damaged area 262 in the area defined by cut 264. Repair plies 266 are prepared to conform substantially to the shape of the stepped area defined by steps 270A through 270G. A plurality of additional plies 272, 274 are then placed over the repaired area to secure the repair plies 266. The repair plies 266 are further secured in place with a layer of adhesive 268 disposed at the junction of the repair plies 266 and the composite structure 260.

The present invention is particularly adapted for generating the taper or stepped cuts in each of the applications described above and is readily adapted for use with both curved and flat composite constructions or other types of materials.

Figure 3:
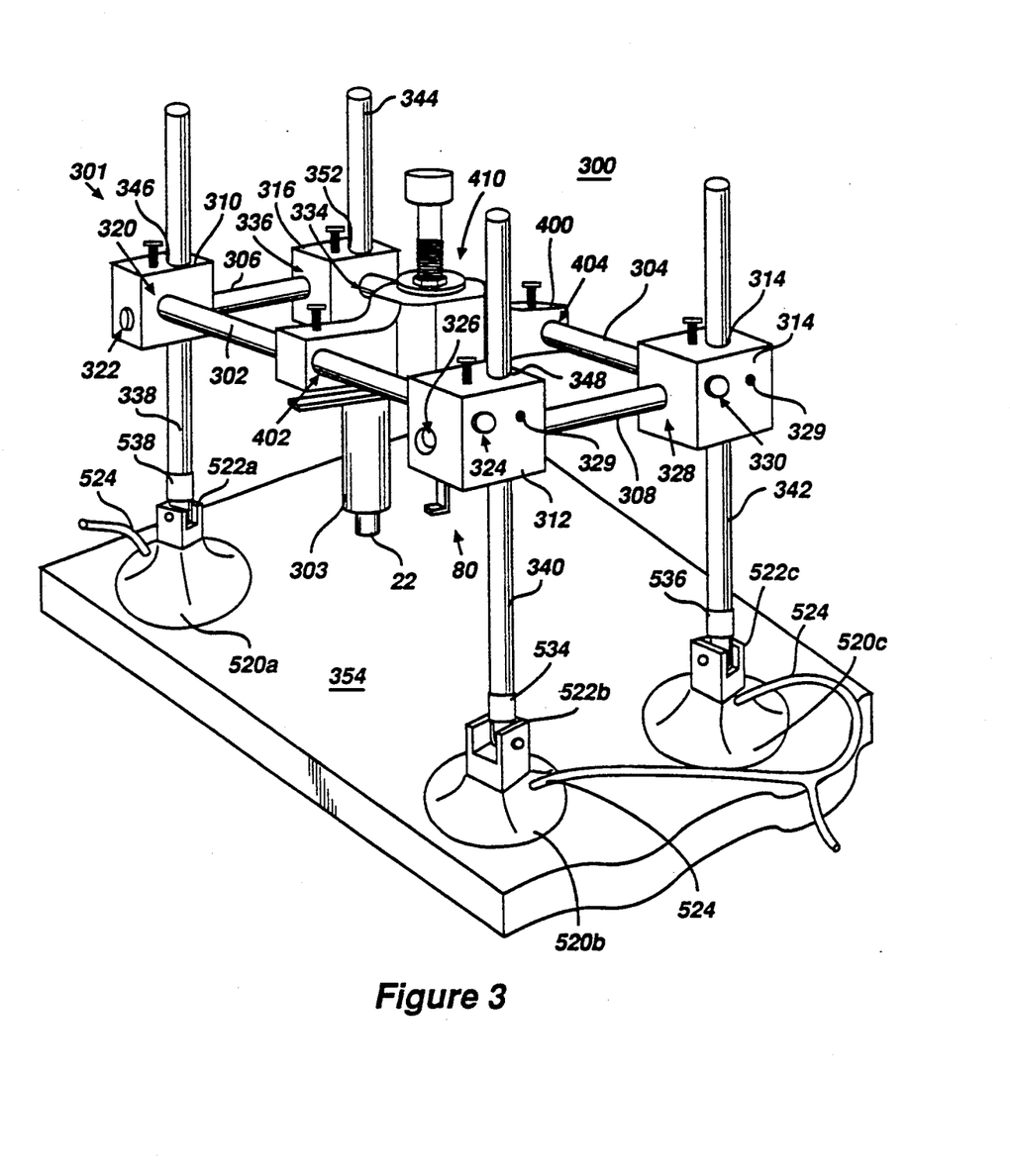
FIG. 3 is an isometric view of the scarfing apparatus 300 of the present invention.

A scarfing apparatus 300 of the present invention is illustrated in FIG. 3. The scarfing apparatus 300 includes a mounting frame 301 which adjustably mounts a positioning assembly 303 to a workpiece 354. A cutting tool 22 is securely mounted to the positioning assembly 303. The positioning assembly 303 is provided to control the three dimensional positioning of the cutting tool 22 with respect to the workpiece 354, as will be described in more detail below with respect to FIGS. 5–8.

The mounting frame 301 includes a plurality of cross-support members 302 and 304 and a plurality of frame members 306 and 308. The cross-support members 302 and 304 are coupled to the frame members 306 and 308 with adjustable blocks 310, 312, 314, and 316 thus forming a support frame 336. The mounting frame 301 also includes a plurality of vertical support members 338, 340, 342, and 344 which are received in the adjustable blocks 310, 312, 314, and 316 through a plurality of respective bores 346, 348, 350, and 352. The plurality of blocks 310, 312, 314, and 316 are positionable along the cross-support members 302 and 304 and the vertical support members 338, 340, 342, and 344 by a plurality of setscrews 329. The vertical support members 338, 340, 342, and 344 suspend the support frame 336 over the workpiece 354. The adjustable block and setscrew arrangement allows the support frame 336 to be positioned at variable distances, vertically and laterally, with respect to the workpiece 354.

A plurality of suction cups 520A, 520B, 520C, and 520D are coupled to a vacuum source through hoses 524 for releasably securing the mounting frame 301 to the workpiece 354. A vacuum is applied to the suction cups 520A, 520B, 520C and 520D to securely attach the mounting frame 301 to the workpiece 354. The suction cups 520A, 520B, 520C, and 520D include respective coupling means 522A, 522B, 522C, and 522D, which are pivotally attached to flanges 533, 534, 536, and 538, disposed at the ends of the vertical support members 338, 340, 342, and 344. The pivotal attachment of the suction cups and vertical support members allows the present apparatus to conform to workpieces having complex surfaces or contours.

A gantry 400 slidably receives the cross-support members 302, 304 in bores 402, 404. The gantry 400 is constructed to travel the full extension of the cross support members 302, 304, bounded on either side by the respective adjustable block members 310–316, thereby to enable the gantry to be variably horizontally positioned along the surface of the workpiece. Accordingly, the mounting frame 301 suitably supports the positioning assembly 303 above the workpiece 354 in a manner so that the positioning assembly 303 may be moved in at least two directions with respect to the workpiece. Those skilled in the art will appreciate that many variations in the mounting frame 301 may be provided to releasably secure the positioning assembly 303 to the workpiece 354.

Figure 4:
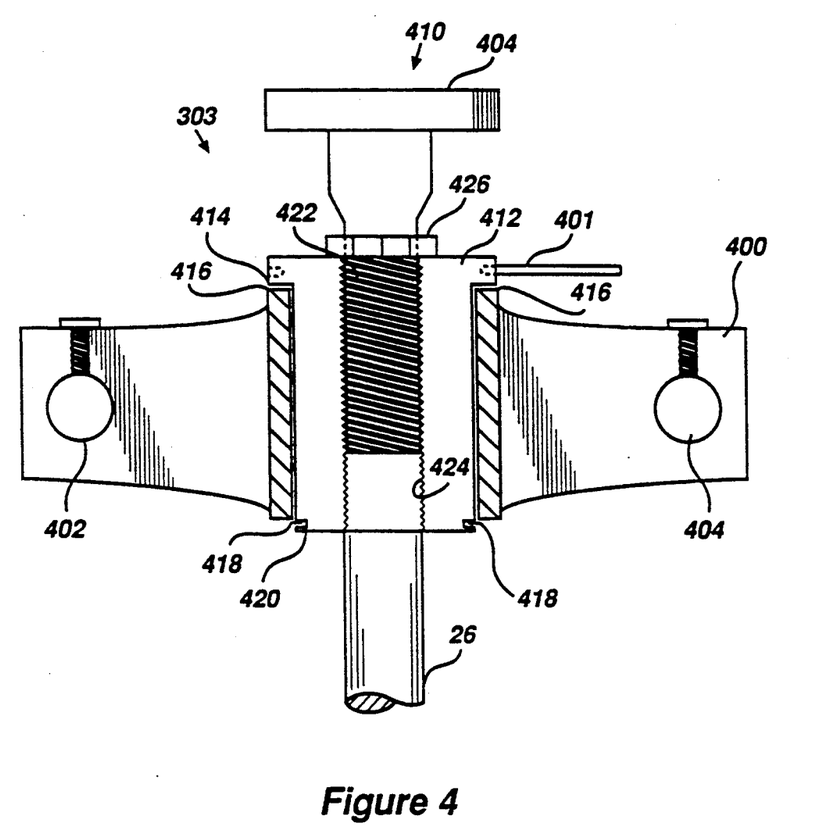
FIG. 4 is a partial cross-sectional view of the interface between the gantry 400 and the rotatable support member 410.

The positioning assembly 303 is mounted to the gantry 400 by a rotatable support member 410, as illustrated in FIG. 4. The rotatable support member 410 is positioned substantially vertically in the approximate midsection of the gantry 400. A bearing member 412 is fixed to a center shaft 26 and disposed between the rotatable support member 410 and the gantry 400 to permit free rotation of the center shaft 26 within the gantry 400. The bearing member 412 retained within the gantry 400 at the uppermost end by a horizontally extending verge 414 which engages an opposing edge 416 of gantry 400. At the bottom of the bearing member 412, a retaining ring 418 engages a concentric groove 420 to prevent vertical movement of the bearing member 412 within the gantry 400. A threaded shaft portion 422 of the rotatable support member 410 is received in a mating threaded aperture 424 of the bearing member 412. A handle 404 is secured to the threaded shaft portion 422 and permits adjustment of the vertical position of the rotatable support member 410 within the bearing 412 and with respect to the gantry 400. Once a desired position for the rotatable support member 410 within the bearing 412 is realized, it is clamped in position with a locking nut 426 and a handle 401. Once locked in position, the handle 404 may be used to rotate the bearing member 412 and shaft 26.

The mounting frame 301 is provided for securely mounting the positioning assembly 303 and cutting tool 22 to the workpiece 354. Once mounted, the rotatable support member 410 may be rotated within the gantry 400 to rotate the positioning assembly 303 and cutting tool 22 in an first circular direction about the damaged area of the workpiece 354.

The scarfing apparatus 300 of the present invention is particularly constructed for providing a scarf on curvilinear surfaces. In scarfing a curvilinear surface, it is desirable to machine the surface so that subsequent repair by the addition of a plurality of layered plies will provide the curvature of the original surface. One method of accomplishing such a scarf is to vary the positioning of the cutting instrument in response to variation in the curvature of the workpiece as the cutting instrument is revolved about the damaged area. A workpiece that is scarfed in this manner is capable of being repaired utilizing a plurality of repair plies in a manner so that the curvature of the workpiece is restored after the repair. Scarfing in this manner also results in a scarfed workpiece having the necessary fiber bonding area of each ply needed to restore the load bearing capability of the structure.

The scarfing apparatus 300 of the present invention varies the position of the cutting tool 22 by sensing the variation in the radius of the curvature of the workpiece 354 as the cutting tool 22 is revolved about the damaged area. The positioning assembly 303 is responsive to the sensed change in curvature of the workpiece 354 to maintain a predetermined spatial relationship between the cutting tool 22 and the surface of the workpiece 354, whether the surface of the workpiece 354 is spherical or curvilinear. More particularly, the positioning assembly 303 maintains the cutting tool 22 at a predetermined taper angle $\theta$ with respect to the tangent of the workpiece 354 so as to machine the workpiece 354 along a tapered plane.

Figure 5:
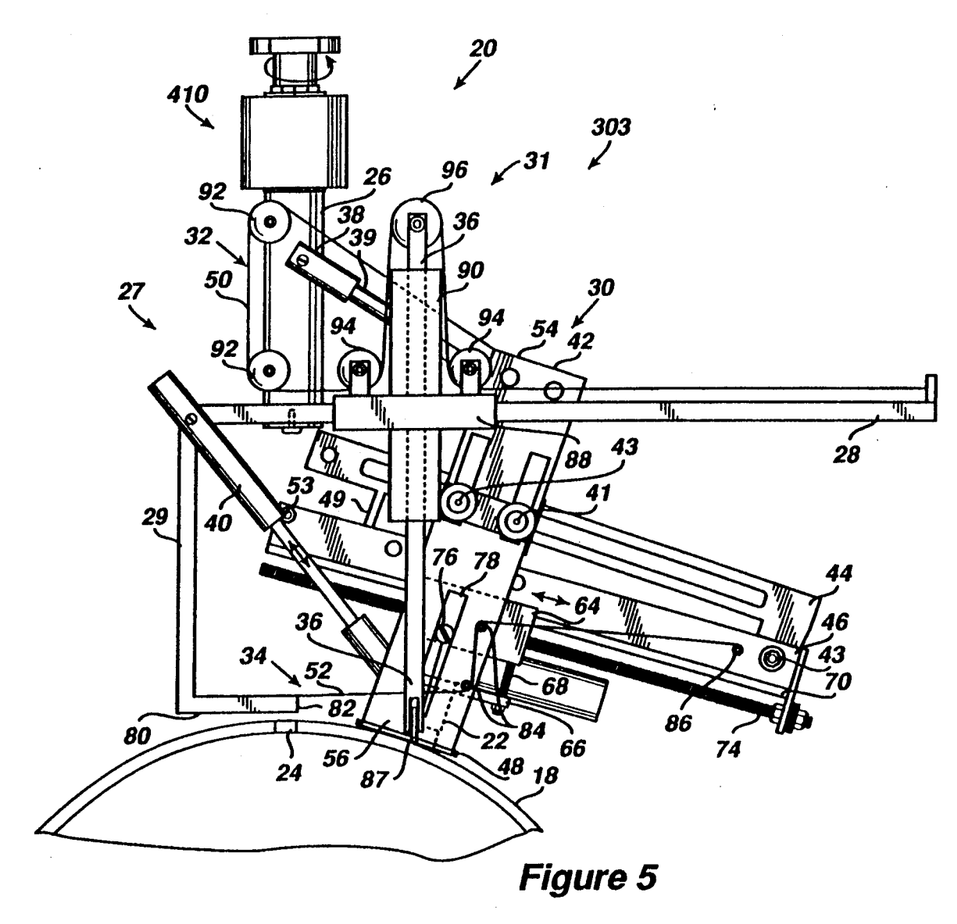
FIG. 5 is a front elevational view of the positioning assembly 303 set up to perform a machining operation on a contour surface.

Referring to FIG. 5, the workpiece 354 has a surface 18 that is curvilinear in contour. The scarfing apparatus 300 is mounted above the surface 18 by the mounting frame 301 and the support member 410, described above. The scarfing apparatus 300 is constructed to revolve the cutting tool 22 around a damaged area 24, as also described above. The scarfing apparatus 300 generally includes a center shaft 26 integrally secured to the support member 410 and vertically disposed above the damaged area 24. The center shaft 26 includes a horizontal guide bar 28 and center pivot extension 29 attached to the bottom portion thereof which combine to provide a reference structure 27 for positioning of the cutting tool 22. As noted above, the center shaft 26 is rotatably mounted to the mounting frame 301. The horizontal guide bar 28 therefore rotates with the center shaft 26 to revolve the cutting tool 22 around the damaged area 24. Rotation of the guide bar 28 also defines a reference plane for sensing the change in curvature of the surface 18 of the workpiece 354, as will be described in more detail below.

A contour following assembly 30 is pivotally mounted to the reference structure 27 by a torque rod 40 and positioned by upper and lower cable assemblies 32, 34. The cutting tool 22 is secured to the contour following assembly 30. A contour sensor 31 is coupled to the horizontal guide bar 28 for sensing the change in radius of the surface, i.e., the change in distance between the surface 18 and the reference plane defined by rotation of the reference structure 27. The contour following assembly 30 is responsive to the change in the radius of the surface 18, sensed by the contour sensor 31, to reposition the cutting tool 22 thereby maintaining a constant spatial relationship between the position of the cutting tool 22 and the surface 18.

The center shaft 26 is rotatably supported by the gantry 400, as described above by reference to FIG. 3. Accordingly, the scarfing apparatus 300 can be positioned on the surface of the workpiece such that the center shaft 26 is located directly above and in line with the damaged area 24 and the reference structure 27 is fixed with respect to the surface 18. When repairing a damaged area 24 on a wing, the gantry can be positioned on the wing in the appropriate position with respect to the damaged area. Once the gantry is properly positioned, the relative positioning of the reference structure 27 and the surface 18 is not changed. The contour following assembly 30 is specifically designed to maintain the proper positioning of the cutting tool 22 such that the cutting tool machines the workpiece along a tapered machining surface.

Figure 6:
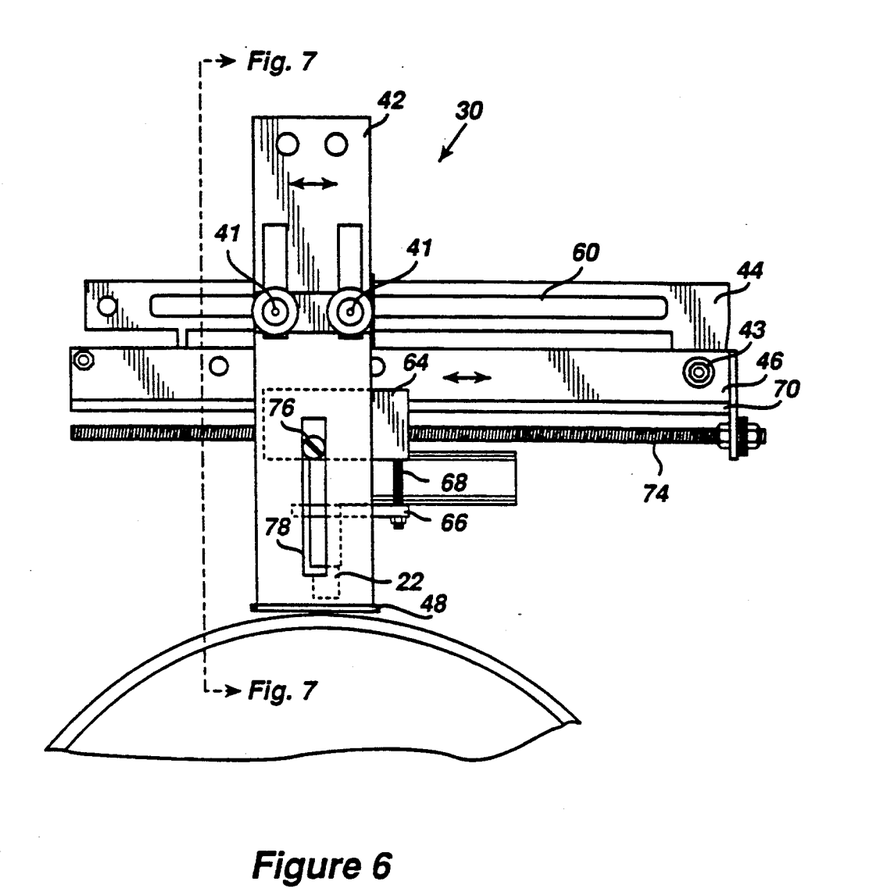
FIG. 6 is a front elevational view of the contour follower and router support portion of the invention.

Referring to FIGS. 5 and 6, the contour following assembly 30 includes a channel member 42, a tangent beam 44 and a taper beam 46. As is described in detail below, the channel member 42 is supported such that it extends normal from the surface 18 of the workpiece 354 being machined as it revolves around the damaged area 24. The tangent beam 44 is secured to the channel member 42 such that it is disposed orthogonally with respect thereto and is, therefore, continuously maintained parallel to the tangent to the work surface. Pivotally secured to the tangent beam 44 is the taper beam 46 about a pivot point 43 in such a manner that the angle therebetween can be adjusted to define a taper angle $\theta$. The taper beam 46 controls the relationship between a taper plane, i.e., the surface cut by the cutting tool 22, and the surface 18. Generally, the taper beam 46 is parallel to the taper plane so that the angle between the taper plane and the tangent to the surface is equal to the taper angle.

Figure 7:
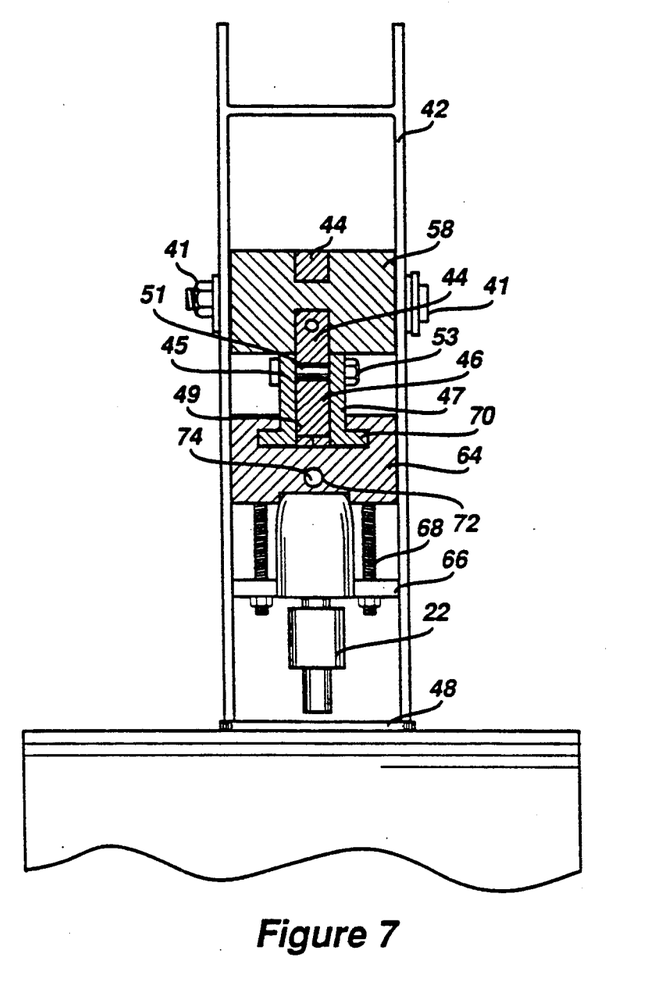
FIG. 7 is a cross-sectional view of the contour follower taken generally along line 7—7 of FIG. 6.

Referring also to FIG. 7, the end of the taper beam 46 opposite the pivot point 43 is substantially U-shaped having legs 45, 47 for receiving a locking arm 49 extending downwardly from the tangent beam 44. A bolt 51 extends through holes provided in each of the legs 45, 47 and has a nut 53 threaded thereon for locking the locking arm 49 of the tangent beam between the legs 45, 47 to maintain the proper taper angle $\theta$ of the taper beam with respect to the tangent beam. The cutting tool 22 is secured to the taper beam so as to extend orthogonally downwardly therefrom. By properly adjusting the angle between the tangent beam 44 and the taper beam 46 to the taper angle $\theta$, the cutting tool is properly positioned relative to the work surface to cut the surface of the workpiece along the taper plane thereof, as described above.

The channel member 42 has a ring 48 disposed at the end proximate the workpiece to assist the channel member in maintaining a position normal to the surface 18 of the workpiece 354. Specifically, the ring 48 is designed to abut against the surface 18 of the workpiece 354, as illustrated in FIGS. 5, 6 and 7. The channel member 42 receives additional support from the upper and lower cable assemblies 32, 34, and the torque rod 40, described in detail below. Briefly, an upper cable 50 of the upper cable assembly 32 and a lower cable 52 of the lower cable assembly 34 extends from the center shaft 26 and center shaft extension 29 to the top and bottom ends 54, 56, respectively, of the channel member 42. Similarly, the torque rod 40 interconnects the upper and lower portions of the channel member 42 to the center shaft 26 and the center shaft extension 29. An upper rod 38 is connected to the center shaft 26 and the channel member 42 to apply pressure to the channel member 42 to maintain tension in the upper cable 50 using an air cylinder 39. Accordingly, the channel member 42 is always maintained normal to the surface of the workpiece. As will be described in detail below, the angle $\theta$ between the taper beam 46 and the tangent beam 44 is adjustable such that it can be set to correspond to the desired taper angle to be machined by the cutting tool 22.

As noted above, the workpiece is machined by moving the cutting tool 22 over a first circular direction around the damaged area 24 and making successive passes along successive radial paths at incrementally smaller radii. To accomplish this, the channel member 42 is slidably mounted to the tangent beam 44 so that the radial position of the channel member 42 and cutting tool 22 may be selected by the operator. While the position of the channel member 42 and the cutting tool is radially adjustable, the tangent beam 44 and taper beam are maintained in a predetermined position with respect to the reference structure 27 during the entire machining operation. Accordingly, the channel member 42 and the cutting tool 22 are slidably disposed along a second linear direction with respect to the reference structure 27 and the surface 18.

Specifically, referring to FIGS. 5, 6 and 7, the channel member 42 includes a cross member 58 which is slidably positioned in a channel 60 of the tangent beam 44. The cross member 58 is secured to the channel member 42 by first and second guide pins 41 and 43. The cutting tool 22 is slidably disposed on the taper beam 46 in such a manner as to extend downwardly toward the workpiece, orthogonally to the taper beam. In particular, the cutting tool 22 is fixedly secured to a slide block 64 utilizing a bracket 66 and screws 68. The slide block 64 is slidably disposed on guide portions 70 of the taper beam 46. With this construction the cutting tool 22 may be displaced in response to pivoting of the taper beam 46 with respect to the tangent beam 44.

The slide block 64 includes a threaded hole 72 for receiving a lead screw 74 which is rotatably disposed in the taper beam 46. Rotation of the lead screw 74 provides a drive force for linear movement of the slide block 64 along the taper beam 46. Further, the slide block 64 includes a pivot pin 76 extending from opposite sides thereof which are slidably disposed in channels 78 longitudinally provided in the channel member 42 such that linear movement of the slide block 64 causes the channel member 42 to also move linearly. A pair of channels 78 are positioned along each side of the channel member 42 to allow the slide block 64 and the pivot pin 76 to move linearly along the channel member 42, as will be described below.

Those skilled in the art will recognize that linear movement of the slide block 64 along the taper beam 46 will cause the cutting tool 22 to move linearly along the channel member 42 by an amount determined by the taper angle and the amount of movement of the slide block 64 along the taper beam 46. As discussed above, the cutting tool 22 is revolved around the damaged area 24 of the surface 18 at incrementally smaller radii, the length of the radii being determined by the position of the slide block 64 along the taper beam 46. Also, as the radius of the revolving cutting tool 22 is made smaller, the cut is desired to be deeper. The taper in the cut, i.e., the increase in depth, is determined by the taper angle between the taper beam 46 and the tangent beam 44.

The center shaft extension 29 and the lower cable assembly 34 are designed to allow the radial position of the contour following assembly 30 to be easily adjusted when the radial position of the cutting tool 22 is being adjusted by the lead screw 74. In particular, as illustrated in FIG. 5, the center shaft extension 29 extends downwardly from the center shaft 26 and includes a horizontally extending bottom portion 80 having an end 82 which is disposed directly below and in line with the center shaft 26. The cable 52 of the lower cable assembly discussed above is secured to the end 82 of the center shaft extension 29, runs through a pair of pulleys 84 disposed on the channel member 42 and is connected to the taper beam 46 at point 86. Rotation of the lead screw 74 causes the channel member 42 and the cutting tool 22 to traverse along the tangent beam 44 and the taper beam 46 thereby adjusting the length of the portion of the cable 52 extending from the end 82 of the center shaft extension 29 to the pulley 84 on the channel member and changing the radial position of the channel member 42 and cutting tool 22 with respect to the center shaft 26. For example, when the lead screw 74 is rotated clockwise, the channel member 42 is caused to move in the right-hand direction of FIG. 5 resulting in the radial position thereof being increased. Alternatively, when the lead screw 74 is rotated counter-clockwise, the channel member 42 is caused to move in the left-hand direction resulting in the radial position thereof being decreased.

The upper cable assembly 32 and the positioning arm 36 provide support for the upper portion of the channel member 42 and also automatically adjust the angular orientation of the channel member, in response to changes in the radius of the surface contour sensed by the contour sensor 31, to insure that the channel member 42 is always maintained normal to the surface 18. In particular, when a portion of a workpiece has a cylindrical surface, such as the leading edge of an airplane wing, the angular orientation of the normal to the surface changes for each arcuate position as the cutting tool revolves around a damaged area at a constant radius. Further, the change in curvature normal to the surface 18 is a function of the change in vertical position of the surface with reference to the reference structure 27. For example, at the maximum vertical position on a cylinder the normal is disposed vertically upwardly, at the midpoint the normal extends horizontally, and at the points between the maximum point and midpoint the angle of the normal correspondingly varies from extending in the vertical direction to the horizontal direction.

Figure 8:
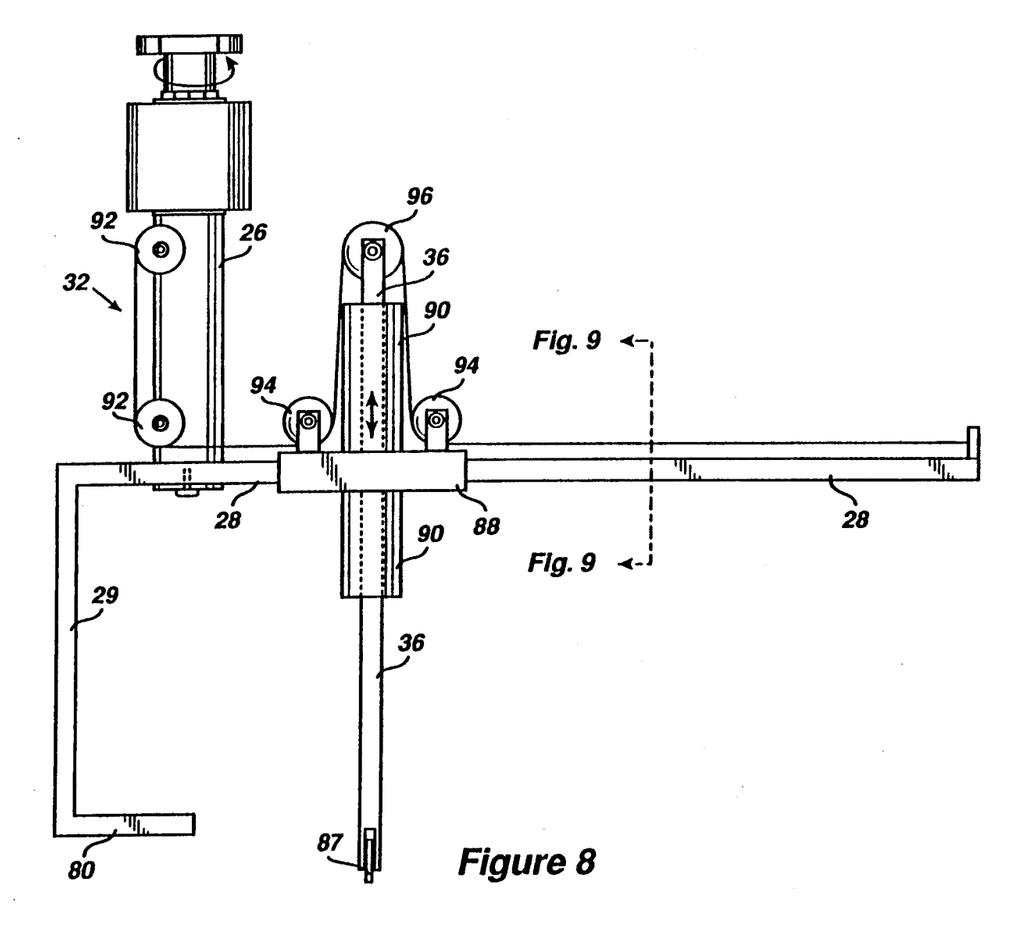
FIG. 8 is a front elevational view of the upper cable assembly portion of the invention.
Figure 9:
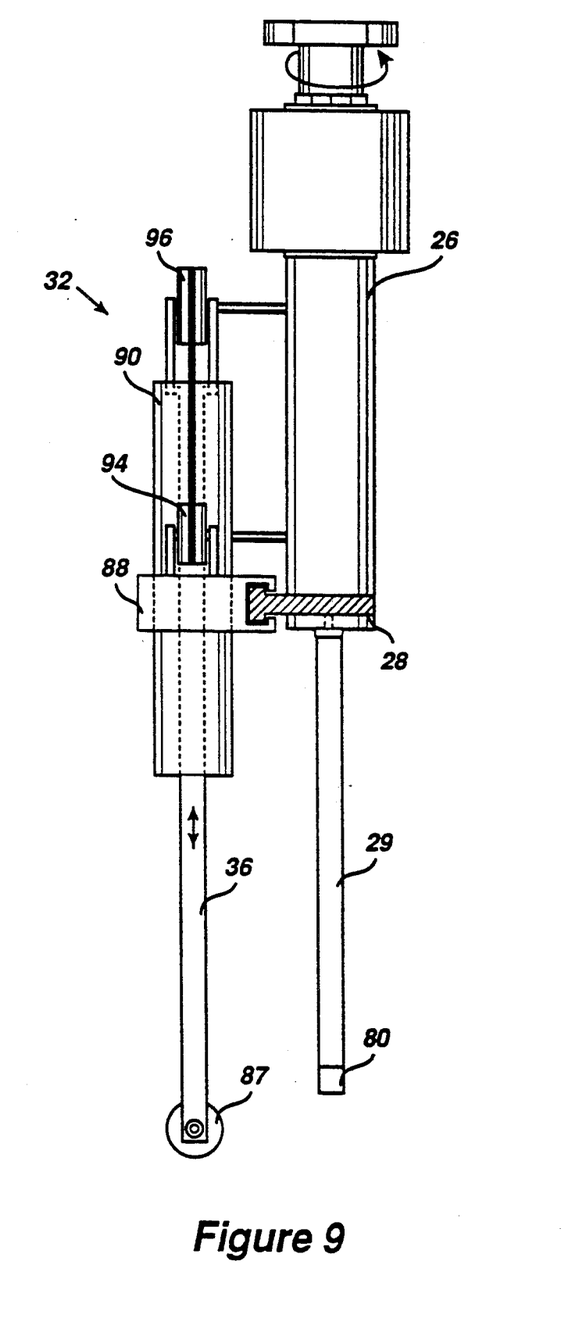
FIG. 9 is a cross-sectional view of the upper cable assembly portion of the invention, taken generally along line 9—9 of FIG. 8.

Referring to FIG. 5, the contour sensor 31 includes a positioning arm 36 that is designed to translate the change in distance between the surface 18 and the reference plane as the cutting tool 22 revolves in a first circular direction such that the position of the contour following assembly 30 can be maintained normal to the surface 18. The upper cable assembly 32 and arm 36 are designed to maintain the channel member 42 of the contour following assembly 30 normal to the surface as the channel member revolves around the damaged area 24 based on the detected change in height of the surface 18. Referring to FIGS. 5, 8 and 9, a wheel 87 is rotatably provided at the bottom of the positioning arm 36. The positioning arm 36 is linked to the channel member 42 to keep the positioning arm 36 substantially close to the cutting tool 22 as the cutting tool 22 revolves in the circular path. A positioning slide block 88 is horizontally slidably disposed along the guide bar 28. A vertically extending cylinder 90 extends through a hole provided in the positioning slide block 88 and is secured thereto. The positioning arm 36 is slidably disposed in the cylinder so as to be moveable in the vertical direction and is urged downwardly such that the wheel 87 is in continuous contact with the surface of the workpiece. Therefore, the positioning arm moves vertically for any change in elevation of the channel member indicating that the angle between the normal to the surface and vertical has changed. The means for urging the positioning arm downwardly would be obvious to one of ordinary skill in the art and could include, for example, air pressure or a mechanical spring.

It has been discovered that for a cylindrical workpiece having a diameter 12 inches, when the channel member is revolved around the damaged area 24 the radial position of the extreme upper portion of the channel member having a length of approximately 10 inches changes at a rate which is approximately twice the change in height of the positioning arm as it travels along the periphery of the damaged area 24. Accordingly, the upper pulley arrangement 32 is designed to adjust the radial position of the upper portion of the channel member by a factor of twice the change in height of the positioning arm. It should be noted that the position at which the cable 50 is secured to the channel member 42 can be adjusted in order to insure that the ratio of the change in radial position where the cable is attached to the channel member and the change in height of the positioning arm is 2 to 1.

As best illustrated in FIG. 8, the upper cable assembly 32 includes a pair of pulleys 92 rotatably secured to the center pivot 26, a pair of pulleys 94 secured to the positioning slide block 92 and another pulley 96 secured to the top of the positioning arm. One end of the upper cable 50 is secured to the upper portion of the channel member, passed through the pulleys 92 on the center pivot, the pulleys 94 on the positioning slide block 70 and the pulley 96 disposed at the top portion of the positioning arm, with the opposite end of the cable 50 being attached to the end of the horizontal guide bar 28. With this arrangement, as the vertical position of the surface changes, the positioning arm 36 is raised or lowered such that the effective length of the cable is correspondingly reduced or increased by a factor of two times the change in height of the positioning arm. Therefore, the top of the channel member 42 is maintained at the proper orientation to maintain the channel member disposed normal to the workpiece surface.

While the preferred embodiment of the invention has been described with respect to a ratio of 2:1 corresponding to the change in radius of the upper portion of the channel member where the cable is attached to the change in elevation of the channel member, it is understood that the invention is not to be limited in this manner. For instance, if the ratio is other than 2:1, a gear mechanism could be utilized to appropriately adjust the length of the cable so as to change the radius of the upper portion of the channel member based on the change in vertical position of the channel member as necessary to maintain the channel member disposed normal to the work surface.

Those skilled in the art will recognize that, although the reference surface has been defined herein as a plane surface, complex surfaces could be used for a reference surface by varying the position of the contour sensor 31 with respect to the reference frame 27 as the contour sensor 31 traverses the first circular direction. Alternatively, the gain of the contour sensor 31 could be varied as the contour sensor traverses the first circular direction. Other methods and apparatus for providing a reference surface with a complex curvature will readily become apparent to those skilled in the art. Also, although the first and second directions have been described herein as circular and linear, respectively, other configurations for the first and second directions are possible by altering the motion of the gantry 400 and/or the construction of the positioning assembly 303. Other mechanisms may be provided for maintaining the channel member 42 normal to the surface 18 such as: ultrasonic or optical apparatus for sensing the change in distance between the reference surface and the surface 18; mechanical or electro-mechanical linkage assemblies for controlling the positioning of the channel member 42 in response to the contour sensor 31.

In summary, an improved scarfing apparatus capable of producing cuts of virtually any depth and shape has been described. While the present invention has been described in the context of a preferred embodiment, other uses and embodiments will be apparent to a person of ordinary skill in the art without departing from the spirit and scope of the present invention. All of such embodiments are intended to fall within the scope of the appended claims.

We claim:

1. An apparatus for producing a controlled tapered cut along a taper plane at a predetermined taper angle on a surface for preparing a damaged area on said workpiece for repair, comprising:
   a tangent beam;
   contour following means for maintaining said tangent beam disposed at a position parallel to the tangent of said workpiece;
   a taper beam pivotally secured to said tangent beam such that the angle between said tangent beam and said taper beam can be set to said taper angle and said taper beam can be disposed parallel to said taper plane
   a cutting tool for cutting a portion of the outer surface of said workpiece, said cutting tool being disposed at a predetermined angle with respect to said taper beam, said contour following means and said cutting tool being slidably disposed with respect to said taper beam;
   means for revolving said tangent beam, contour following means, taper beam and cutting tool about a center point corresponding to said damaged area;
   means for adjusting the cutting radius at which said cutting tool revolves around said damaged area by sliding said cutting tool and said contour following means along said taper beam such that said work piece can initially revolve around said damaged area at a predetermined maximum radius, said adjusting means incrementally reducing said cutting radius after each revolution until the entire damaged area of said workpiece has been machined by said cutting tool.

2. Apparatus for producing a repair region in the surface of a workpiece with a cutting instrument comprising:
   contour follower means for moving the cutting instrument in a first direction with respect to the surface of the workpiece, said contour follower means being constructed to position the cutting instrument proximate the surface of the workpiece said contour follower means including taper adjustment means for varying the angular relationship between the surface of the cutting instrument and a line normal to the surface proximate the cutting instrument; and
   contour sensor means for sensing the change in the spatial relationship between the surface of the workpiece and a reference surface, said contour follower means being responsive to said contour sensor means for repositioning the cutting instrument thereby to maintain the angular relationship established by said taper adjustment means as the cutting instrument is moved in the first direction.

3. The apparatus as recited in claim 2 further comprising reference frame means for positioning said contour sensor means said contour sensor means being constructed to sense the change in radius of the surface of the workpiece with respect to the position of said reference frame means so that said reference frame means defines the reference surface.

4. The apparatus as recited in claim 3 wherein said contour follower means is movably fixed to said reference frame means and wherein said contour follower means further comprises positioning means responsive to said sensor means for altering the position of the cutting tool with respect to said reference frame means thereby to maintain the predetermined spatial relationship between the cutting instrument and the surface of the workpiece as the cutting instrument is moved in the first direction.

5. The apparatus as recited in claim 4 wherein said reference frame means comprises:
   a mounting portion having a plurality of vertical support members coupled to a support frame for positioning said support frame in a spaced relationship with the surface of the workpiece, said mounting portion including means for releasably securing said plurality of vertical support members to the surface of the workpiece so that said support frame maintains a fixed position with respect to the surface of the workpiece; and
   a moving portion coupled to said mounting portion and constructed to move with respect to the surface of the workpiece to define the first direction, said contour sensing means and said contour follower means being fixed to said moving portion.

6. The apparatus as recited in claim 5 wherein said reference frame means further comprises means for coupling said moving portion to said mounting portion for rotational movement in a plane wherein the plane defines the reference surface.

7. The apparatus as recited in claim 6 wherein said taper adjustment means comprises radial movement means for moving the cutting instrument angularly with respect to said contour follower means, said taper adjustment means being further adapted to increase and decrease the depth of cut provided by the cutting instrument, as a function of the radial movement of the cutting instrument, to define the predetermined angular relationship.

8. A method for scarfing the surface of a workpiece, wherein the workpiece has a radius associated therewith and wherein the radius of the workpiece varies over the surface thereof, comprising the steps of:
   selecting a taper angle and positioning a cutting instrument at the selected taper angle so that the cutting edge of the cutting instrument is angled with respect to the tangent to the workpiece, proximate the cutting instrument;
   moving the cutting instrument in a first direction over the surface of the workpiece to cut the surface;
   sensing the change in the radius of the surface of the workpiece as the cutting instrument is moved in the first direction over the surface of the workpiece; and
   altering the position of the cutting instrument to maintain the angular relationship between the cutting instrument and the surface of the workpiece as the cutting instrument is moved in the first direction.

9. The method as recited in claim 8 further comprising the steps of:
   moving the cutting instrument in a second direction over the surface of the workpiece; and
   altering the position of the cutting instrument with respect to the surface of the workpiece to change the depth of cut provided by the cutting tool.

10. An apparatus for producing a controlled tapered cut on a workpiece for preparing a damaged area for repair, comprising:
    a cutting tool;
    position maintaining means for maintaining said cutting tool in a position where said cutting tool machines the workpiece along a taper plane angularly disposed with respect to a tangent to the surface of the workpiece by a taper angle, said position maintaining means including means for varying said taper angle;

means for revolving said cutting tool and said position maintaining means around said damaged area wherein, as said cutting and said position maintaining means revolve around said damaged area, said position maintaining means maintains the cutting tool in said position; and means for adjusting a cutting radius at which said cutting tool revolves around said damaged area such that said cutting tool initially revolves around said damaged area at a predetermined maximum radius, said adjusting means incrementally reducing said cutting radius after each revolution until the entire damaged area of said workpiece has been machined by said cutting tool.

11. The device of claim 10 wherein said revolving means comprises:

a center pivot about which said cutting tool and said position maintaining means revolves, said center pivot being vertically disposed above said cutting tool and said position maintaining means: and at least one torque arm interconnecting said center pivot to said position maintaining means.

12. An apparatus for producing a controlled tapered cut on a workpiece for preparing a damaged area for repair, comprising:

position maintaining means for maintaining said cutting tool in a position where said cutting tool machines said workpiece along a taper plane angularly disposed with respect to a tangent to the surface of said workpiece by a taper angle, said position maintaining means including: means for varying said taper angle;

a cutting tool;

a tangent beam;

tangent beam positioning means for maintaining said tangent beam disposed at a position parallel to the tangent of said workpiece at the position where said tool is located;

a taper beam pivotally secured to said tangent beam such that the angle between said tangent beam and said taper beam can be varied to vary said taper angle, said cutting tool being slidably secured to said taper beam wherein when said taper beam is set to said taper angle said cutting tool machines said workpiece along a taper plane; and means for revolving said cutting tool and said position maintaining means around said damaged area wherein, as said cutting tool and said position maintaining means revolve around said damaged area, said position maintaining means maintains the cutting tool in said position.

13. The device of claim 12 wherein said tangent beam positioning means comprises:

a channel member to which said tangent beam is secured orthogonally with respect thereto, said channel member being slidable with respect to said taper beam and tangent beam; and channel member positioning means for continuously maintaining said channel member disposed normal to the surface of the workpiece.

14. The device of claim 13 wherein said channel member positioning means comprises:

a cable extending from a center pivot and being connected at one end thereof to said channel member at a position displaced from said workpiece; and means for adjusting the length of said cable between said channel member and said center pivot based on the difference in angle between the normal to said surface below said center pivot and the normal to said surface where a contour following arm contacts said surface, said cable length being decreased as said difference decreases and being increased as said difference increases so as to correspondingly adjust the angular position of said channel member.

15. The device of claim 14 wherein said cable length adjusting means comprises:

a beam secured to said center pivot and extending orthogonally therefrom in the horizontal direction, the other end of said cable being connected thereto; and a positioning arm slidably disposed on said beam so as to be moveable in both the horizontal and vertical directions, one end of said positioning arm being slidably disposed on said surface;

pulley means provided on the other end of said positioning arm through which said cable runs for increasing or decreasing said length of said cable based on the vertical position of said positioning arm, wherein when said one end of said positioning arm slides up said surface, said positioning arm slides vertically upwardly causing said length of said cable from said center pivot to said contour following arm to decrease and wherein when said one end of said positioning arm slide down said surface, said positioning arm slides vertically downwardly causing said length to increase.

16. The device of claim 14 wherein said cutting radius adjusting means comprises:

a center pivot extension connected to said center pivot and extending downwardly, an end of said center pivot extension being disposed vertically below said center pivot;

a pair of pulleys disposed on said channel member;

a cable having one end connected to said end of said center pivot extension and the other end connected to said taper beam, said cable passing through said pulleys; and adjusting means for adjusting the position of said channel member and said cutting tool with respect to said taper beam and said center pivot such that said channel member and said cutting tool traverse along said cable so that the distance between said center pivot extension and said channel member is adjusted.

17. The device of claim 16 wherein said adjusting means comprises:

a drive screw rotatably disposed on said taper beam;

a slide block slidably disposed on said taper beam and engaged with said channel member, said slide block having a threaded hole provided therein for receiving said drive screw wherein when said feed screw is rotated, said slide block and said channel member slide therealong.

18. A method for producing a controlled taper cut on a workpiece for preparing a damaged area for repair, comprising the following steps:

providing a cutting tool;

selecting a taper angle and positioning said cutting tool at the selected taper angle with respect to a tangent to the surface of said workpiece;

maintaining said cutting tool in a position where said cutting tool machines said workpiece along a taper plane;
revolving said cutting tool around said damaged area at a predetermined maximum radius; and
incrementally reducing said radius after each revolution such that said cutting tool machines said surface along said taper plane until the entire damaged area of said workpiece has been machined by said cutting tool.

* * * * *